(12) United States Patent
Arslan et al.

(10) Patent No.: US 6,487,255 B1
(45) Date of Patent: Nov. 26, 2002

(54) INFORMATION GENERATION FOR COHERENT DEMODULATION OF DIFFERENTIALLY ENCODED SIGNALS

(75) Inventors: Hüseyin Arslan, Raleigh; Gregory E. Bottomley; Rajaram Ramésh, both of Cary, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/143,754

(22) Filed: Aug. 31, 1998

(51) Int. Cl.$^7$ .................................................. H04L 5/12
(52) U.S. Cl. ...................... 375/262; 375/283; 375/325; 375/341; 375/348; 714/794
(58) Field of Search ................................ 375/262, 264, 375/265, 267, 283, 325, 340, 341, 347, 348, 349, 324; 714/794, 795; 329/304

(56) References Cited

U.S. PATENT DOCUMENTS

| | | | |
|---|---|---|---|
| 5,202,903 A | * 4/1993 | Okanoue ..................... 375/100 |
| 5,285,480 A | 2/1994 | Chennakeshu et al. ..... 375/101 |
| 5,513,215 A | * 4/1996 | Marchetto et al. .......... 375/233 |
| 5,608,763 A | 3/1997 | Chiasson et al. ............ 375/332 |
| 5,680,419 A | * 10/1997 | Bottomley ................... 375/347 |
| 5,706,313 A | 1/1998 | Blasiak et al. .............. 375/330 |
| 5,754,599 A | * 5/1998 | Ling et al. .................. 375/340 |
| 5,754,600 A | 5/1998 | Rahnema ..................... 375/341 |
| 5,768,307 A | * 6/1998 | Schramm et al. ........... 375/208 |
| 5,867,538 A | * 2/1999 | Liu ............................. 375/341 |
| 5,926,511 A | * 7/1999 | Fleischmann ................ 375/341 |
| 6,151,487 A | * 11/2000 | Kime et al. .................. 455/134 |

FOREIGN PATENT DOCUMENTS

| | | | |
|---|---|---|---|
| EP | 0504890 A2 | 9/1992 | ........... H04L/27/22 |
| EP | 0731587 A2 | 9/1996 | ........... H04L/27/22 |
| EP | 0788244 A1 | 8/1997 | ............ H04B/7/01 |
| WO | WO96/10879 | 4/1996 | ........... H04L/27/30 |
| WO | WO98/36580 | 8/1998 | |

OTHER PUBLICATIONS

International Search Report, International Application No. PCT/US99/19221.

Forney, G. David, Maximum–Likelihood Sequence Estimation of Digital Sequences in the Presence of Intersymbol Interference, *IEEE Transactions on Information Theory,* vol. IT–18, No. 3, pp. 363–378 (May 1972).

(List continued on next page.)

*Primary Examiner*—Stephen Chin
*Assistant Examiner*—Dac V. Ha
(74) *Attorney, Agent, or Firm*—Myers Bigel Sibley & Sajovec

(57) ABSTRACT

Methods and systems are provided which generate hard and soft values from signal samples of a differentially encoded signal by estimating channel coefficients associated with the received signal and determining metrics for each possible symbol pair which indicate the probability of a possible coherent symbol pair being encoded in the signal samples using the estimated channel coefficients and the signal samples. Soft values associated with differential bits or differential symbols encoded in the samples of the signal are then generated based on the determined metrics.

78 Claims, 10 Drawing Sheets

OTHER PUBLICATIONS

Liu, et al., A Soft–Output Bidirectional Decision Feedback Equalization Technique for TDMA Cellular Radio, *IEEE Journal on Selected Areas in Communications,* vol. 11, No. 7, pp. 1034–1045 (Sep. 1993).

Park, et al., Soft Output Equalization Techniques for π/4–DQPSK Mobile Radio, *IEEE,* pp. 1503–1507 (1997).

Hagenauer, et al., A Viterbi Algorithm with Soft–Decision Outputs and its Applications, *IEEE,* pp. 1680–1686 (1989).

Marvin K. Simon and Dariush Divsalar, "On the optimality of classical coherent receivers of differentially encoded M–PSK," *IEEE Commun. Letters.* vol. 1, No. 3, May 1997.

W. Koch and A. Baier, "Optimum and submoptimum detection of coded data distributed by time–varying intersymbol interference," *IEEE Globecome '90.* 1990, pp. 807.5.1–6.

F. Adachi, "Postdetection optimal diversity combiner for DPSK differential detection," *IEEE Trans. on Vehic. Technol.* vol. 42, No. 3, Aug. 1993, pp. 326–337.

Mark Wallace and Yow–Jong Liu, "Performance of channel codec with channel state information for the equalized cellular radio channels," *Proc.$42^{nd}$ IEEE Veh. Technol. Conf.* Denver, CO, pp. 376–379, 1992.

G.D. Forney, Jr., "The Viterbi Algorithm," *Proceeding of the IEEE.* vol. 61, No. 3, Mar. 1973.

G. Bottomley and K. Jamal, "Adaptive arrays and MLSE equalization," *IEEE Vehicular Technology Conference.* vol. 1, 1995, pp. 50–54.

N. Seshadri and P. Hoeher, "On post–decision symbol–reality generation," *IEEE Intl. Conf. Commun.* (ICC '93). Geneva, May 23–26, 1993.

* cited by examiner

INFORMATION GENERATION FOR COHERENT DEMODULATION OF DIFFERENTIALLY ENCODED SIGNALS

FIELD OF THE INVENTION

The present invention relates generally to radiotelephones and more particularly to the coherent demodulation of differentially encoded quadrature phase shift keying (DQPSK) signals.

BACKGROUND OF THE INVENTION

The performance of receivers in wireless radio communications systems may degrade severely due to multipath fading. Although anti-fading techniques, like antenna diversity, equalization, and adaptive array processing, may be very effective in improving the performance of the receiver, forward error correction (FEC) techniques may be necessary to achieve acceptable voice and data transmission in wireless communication systems. FEC techniques provide redundancy by adding extra bits to the actual information bits, which allows the decoder to detect and correct errors. In the receiver, the decoding process can be performed by either using hard information values or soft information values, which are provided by the demodulator. Decoding using soft information values improves the receiver performance over decoding using hard information values. Therefore, to improve decoder performance, it may be important to provide accurate soft information from the demodulation process.

The U.S. digital cellular system (IS-136) uses $\pi/4$ shifted-DQPSK as a modulation scheme. Differential encoding of the transmitted signals allows both coherent and differential demodulation of the received signal. Although differential demodulators may not be complex to implement, it is widely accepted that the performance of differential detectors degrades rapidly in the presence of Inter-Symbol Interference (ISI) which may be caused by multi-path propagation. Therefore, coherent demodulators with equalizers are commonly used in many receivers. Such a receiver is described in U.S. Pat. No. 5,285,480 to Chennakeshu et al., entitled ADAPTIVE MSLE-VA RECEIVER FOR DIGITAL CELLULAR RADIO.

FIG. 1 depicts a block diagram of a $\pi/4$ shifted-DQPSK system with a conventional differential demodulator receiver. The transmitter 105 includes encoder 101 and differential modulator 102. Information bits are encoded in encoder 101 to produce coded bits. The coded bits are differentially modulated in differential modulator 102 to produce a differentially modulated signal, which is provided to antenna 104 for transmission. The transmitted signal reaches the radio receiver after passing through a propagation medium (e.g., a mobile radio channel). The transmitted signal plus any noise are received at the receiver antenna 106 and the received signal provided to receiver 114. The received signal is processed by the radio processor 108 which amplifies, mixes, filters, samples and quantizes the received signal to produce a baseband signal. A differential demodulator 110 demodulates the received signal and provides symbol or bit values to the decoder 112 which decodes the encoded bits and which may detect and correct possible errors in the received signal. As discussed above, the output of the demodulator 110 is preferably soft values which may provide higher performance in decoding.

Differential encoding of the transmitted signals allows both coherent and differential demodulation of the received signal. FIG. 2 shows a block diagram of a known apparatus for differential demodulation of the DQPSK modulated signals. The differential detector uses received samples to get hard and/or soft decision values. The present received sample is coupled to the multiplier 203. The present received sample is also fed into a delay 201. The delay 201 is coupled to a conjugate operator 202, and the output of the conjugate operator 202 is coupled to the multiplier 203.

In operation, the present received sample and the delayed and conjugated received sample are multiplied to undo the effect of the differential encoder at the transmitter. The real 204 and imaginary 205 part of the output of the multiplier provide the soft bit values corresponding to the two bits sent in one, di-bit symbol. Also, the hard values can be obtained by taking the sign 206 and 207 of the soft values as desired.

FIG. 3 shows a block diagram of a known apparatus for coherent demodulation of the DQPSK modulated signals. The coherent receiver utilizes channel estimation unit 302 which estimates the amplitude and phase of the mobile radio channel. These channel estimates are passed to the coherent QPSK demodulator 301 where the estimates of the QPSK symbols are generated. The channel parameters can be estimated using the known data sequences which are periodically inserted into the transmitted information sequences. In systems where the channel parameters change over the transmission of two consecutive known data sequences, like the U.S. digital cellular system (IS-136), it is desirable to adapt the channel parameters during the transmission of unknown data sequences. Such an adaptive coherent receiver is described in U.S. Pat. No. 5,285,480 to Chennakeshu et al. entitled ADAPTIVE MLSE-VA RECEIVER FOR DIGITAL CELLULAR RADIO.

The output values of the coherent QPSK demodulator 301, which are the hard coherent symbols, are passed through a differential detector 303 to undo the effect of the differential encoder in the transmitter. The outputs of the differential detector are the hard decision values corresponding to the transmitted information bits.

A semi-coherent demodulation of the DQPSK modulated signals is described in U.S. Pat. No. 5,706,313 to Blasiak et al. entitled SOFT DECISION DIGITAL COMMUNICATION AND METHOD AND APPARATUS in which only the phase and frequency offset are estimated using the received signal. After compensating the phase and frequency offset, the likelihood of each possible QPSK symbol value for each sample is calculated. Therefore, a likelihood vector for each sample is obtained and this likelihood vector is provided to the decoder. The decoder uses the likelihood vectors to estimate the transmitted symbol values.

Another conventional method for the soft decoding of differentially encoded QPSK signal is described in U.S. Pat. No. 5,754,600 to Rahnema entitled METHOD AND APPARATUS FOR OPTIMUM SOFT-DECISION VITERBI DECODING OF CONVOLUTIONAL DIFFERENTIAL ENCODED QPSK DATA IN COHERENT DETECTION. In this apparatus the differential and Viterbi decoders are integrated, i.e., differential decoding is part of the convolutional decoding process.

Soft information for maximum likelihood sequence estimation (MLSE) for frequency selective fading channels has been extensively studied, for example as described in J. Hagenauer and P. Hoeher, "A Viterbi algorithm with soft-decision outputs and its applications", *Proceeding of IEEE Globecom Conference*, pp. 47.1.1–47.1.7, Dallas, Tex., USA, November 1989. These techniques have been extended to $\pi/4$ shifted-DQPSK systems for example as described in Jong Park, Stephan B. Wicker and Henry L. Owen, "Soft Output Equalization Techniques for π/4 DQPSK Mobile Radio", *IEEE International Conference on Communications*, pp. 1503–1507, Dallas, Tex., USA, 1997. However, relatively little work has been directed towards soft information generation for coherent detection of π/4 shifted-DQPSK in non-ISI channels, i.e. channels without significant inter-symbol interference (ISI). A suboptimal approach is given that requires exponentiation and logarithm operation in Yow-Jong Liu, Mark Wallace and John W. Ketchum, "A Soft-Output Bidirectional Decision Feedback Equalization Technique for TDMA Cellular Radio", *IEEE Journal on selected areas in commun.*, Vol. 11, No. 7, September 1993. This approach does not consider all possible symbol values in determining a soft value and, further, does not result in a unique solution.

In light of the above discussion, a need exists for improved performance in soft value determination for coherent demodulation of differentially encoded signals for non-ISI channels.

SUMMARY OF THE INVENTION

In view of the above discussion, it is an object of the present invention to provide accurate soft values for differentially encoded information.

A further object of the present invention is to provide soft values in a manner which does not require complex implementation.

Still another object of the present invention is to provide soft values from coherent detection of differentially encoded bits or symbols.

These and other objects of the present invention are provided by methods and systems which generate soft values from signal samples of a differentially encoded signal by estimating channel coefficients associated with the signal and determining metrics for each possible combination of current and previous coherent symbol values which indicate the probability of a possible differential bit value being encoded in the signal using the estimated channel coefficients and the signal samples. Soft values associated with a bit or symbol encoded in the signal are then generated based on the determined metrics.

The use of each potential current and previous coherent symbol value in determining a combined metric provides metrics which take into account the probability of each potential symbol value. Thus, by utilizing metrics associated with each potential symbol value, an accurate soft value may be obtained.

In a further embodiment of the present invention, determining a soft value is done by summing the metrics for each possible current and previous coherent symbol value that corresponds to a first differential bit value to provide a first value metric sum and summing the metrics for each possible current and previous symbol value corresponding to a second differential bit value to provide a second value metric sum. The first value metric sum may be divided by the second value metric sum to provide a ratio of probabilities of the differential bit value being the first value and differential bit value being the second value. Further, the metrics may be exponentiated and the exponentiated metrics summed for each possible symbol pair corresponding to a first bit value to provide a first value metric sum. The exponentiated metrics are also summed for each possible symbol pair corresponding to a second bit value to provide a second value metric sum. Also, the logarithm of the ratio of probabilities may be taken to provide the soft value for the bit.

Furthermore, where the differentially encoded signal is received at a plurality of antennas and channel coefficients associated with each of the plurality of antennas are estimated, metrics may be determined for each possible coherent symbol value which indicate the probability of a possible symbol value being encoded in the signal using the estimated channel coefficients and the signal for each antenna. In such a case, each metric is a sum of metrics for each antenna. Also, an impairment correlation may be determined for the plurality of antennas. Metrics may then be determined for each possible symbol value which indicate the probability of a possible coherent symbol value being encoded in the signal using the estimated channel coefficients, the impairment correlation and the signal for each antenna. A noise power associated with the received signal may be determined and the metrics determined based in part on the noise power.

In a particular embodiment, a detected value is determined from the signal samples and the channel coefficients. The detected values may be bit values for symbols encoded in the differentially encoded signal. Furthermore, the determined soft values may be associated the detected bit values.

Preferably, the signal samples are generated by a radio-telephone receiving and processing a differentially encoded signal.

In another embodiment of the present invention, soft values are generated from signal samples by estimating channel coefficients associated with the received signal and determining metrics for each possible coherent symbol value which indicate the probability of a possible symbol value being encoded in the signal samples of the signal using the estimated channel coefficients and the signal samples of the received signal. The maximum of the combined metrics for each possible current and previous symbol value corresponding to first bit value is determined to provide a first maximum metric value. The maximum metric of the combined metrics for each possible current and previous symbol value corresponding to a second bit value is also determined to provide a second minimum metric value. The second maximum metric value is then subtracted from the first maximum metric value to provide a difference of log likelihoods of the bit value being the first bit value and the bit value being the second bit value. By selecting the maximum values the complexity of the soft value determination may be reduced as the exponentiation and logarithm need not be determined.

In still another embodiment of the present invention, soft values are generated from signal samples by estimating channel coefficients associated with the signal and determining metrics for detected coherent symbol values which indicate the probability of the possible symbol values being encoded in the signal using the estimated channel coefficients and the signal samples of the signal. A detected term is determined from the metrics associated with the detected symbols which provides a first value metric corresponding to the detected differential bit. A second value metric, which corresponds to the non-detected bit, is obtained by obtaining the two different metric values by either flipping the current detected coherent symbol value or the previous detected coherent symbol value and keeping the other coherent symbol value as the detected value and selecting the maximum metric value among these two values. This alternative embodiment may further reduce the complexity of the soft value determination by basing the soft value determination on a detected symbol value.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

Figure 1:
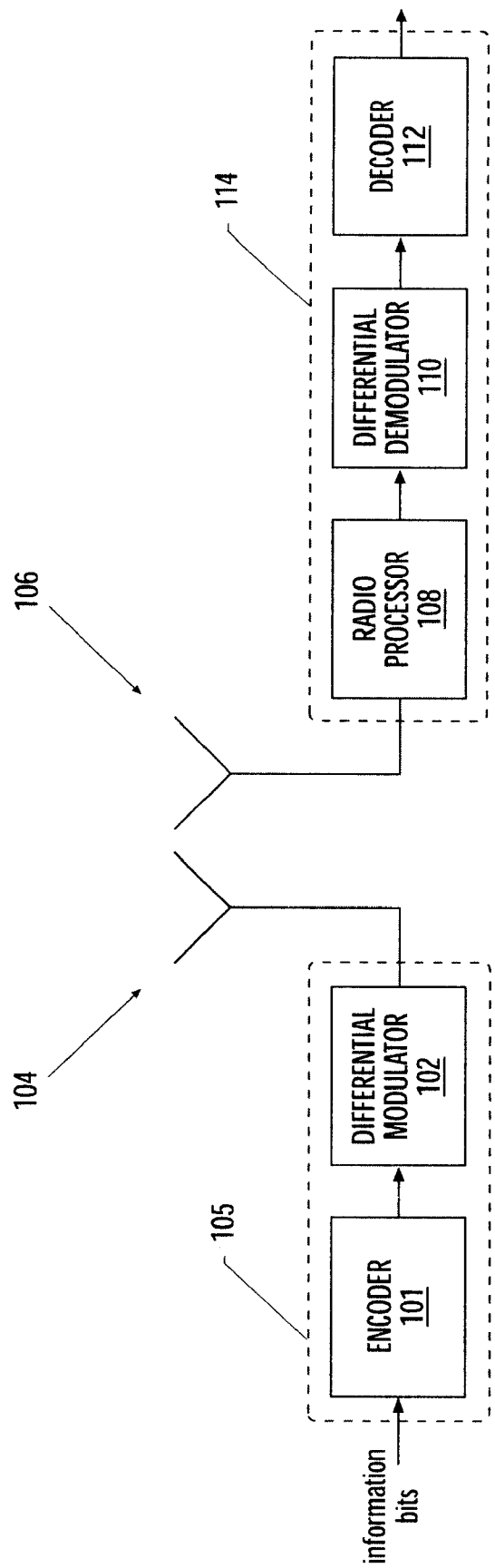
FIG. 1 is a block diagram of a convention DQPSK communication system.
Figure 2:
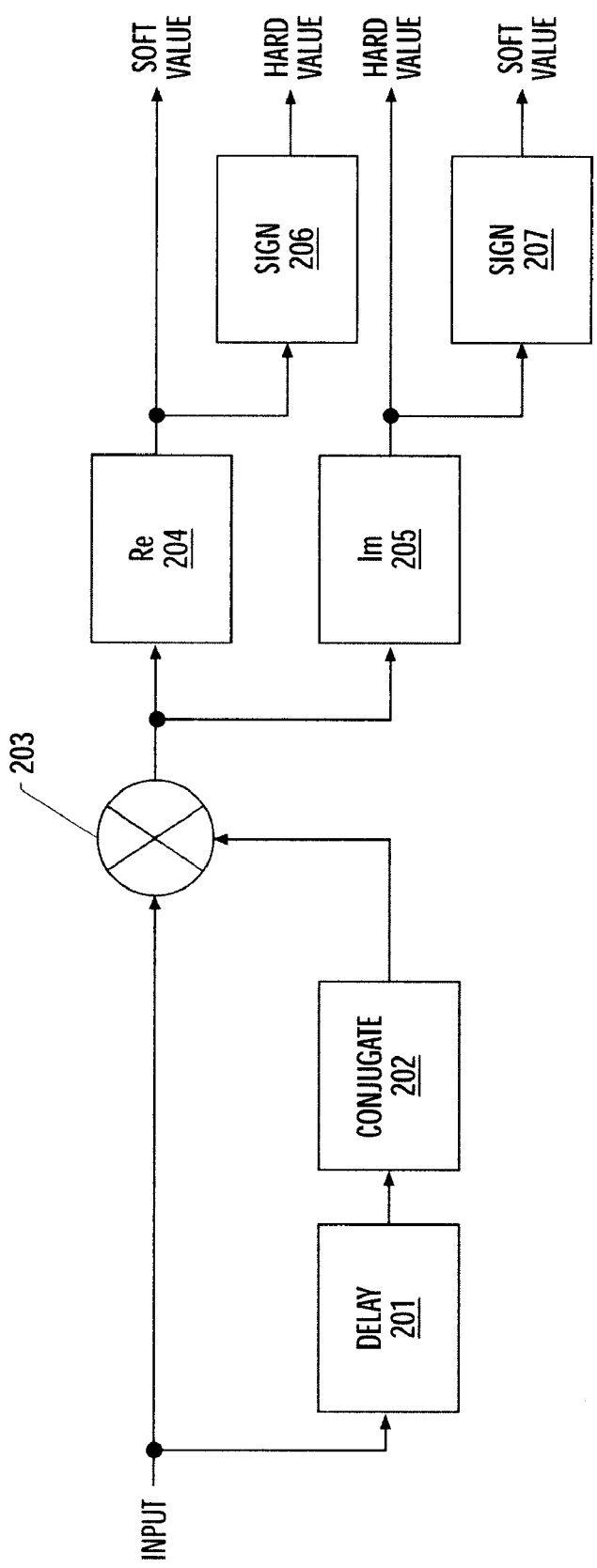
FIG. 2 is a block diagram of a conventional system for demodulation of DQPSK signals.
Figure 3:
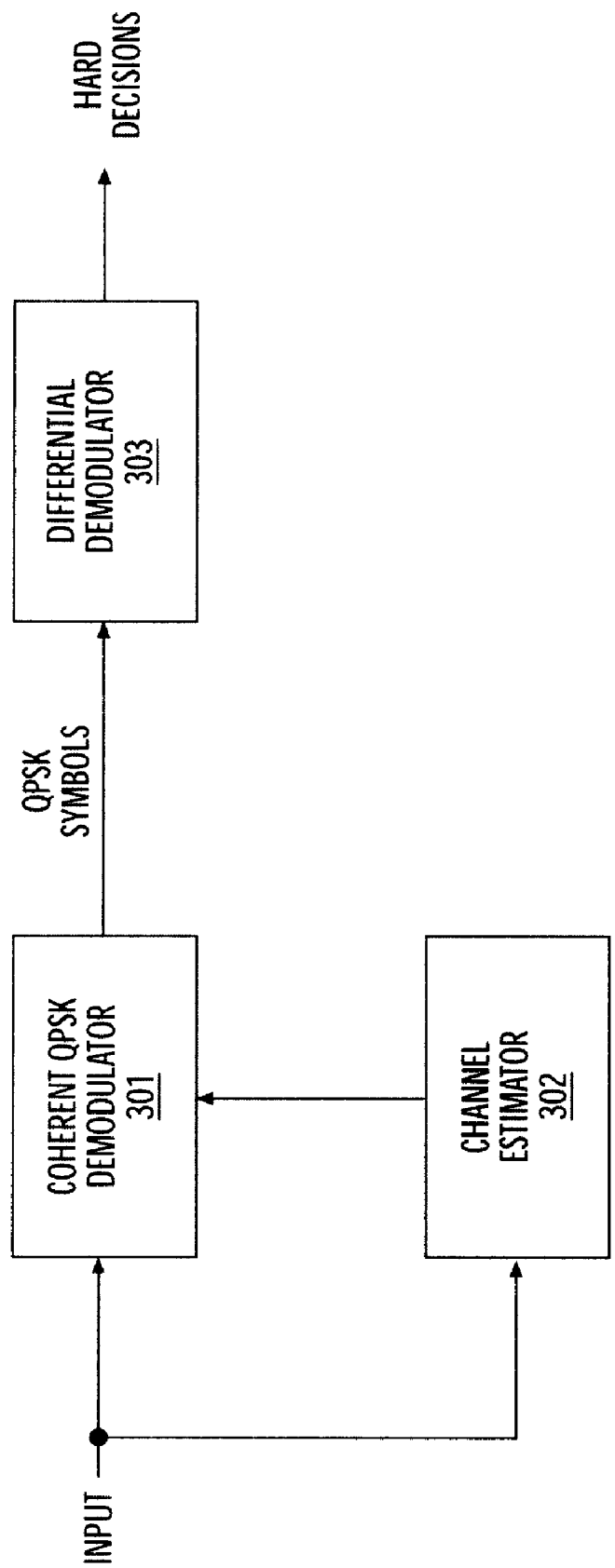
FIG. 3 is a block diagram of a conventional system for coherent demodulation of DQPSK signals.
Figure 4:
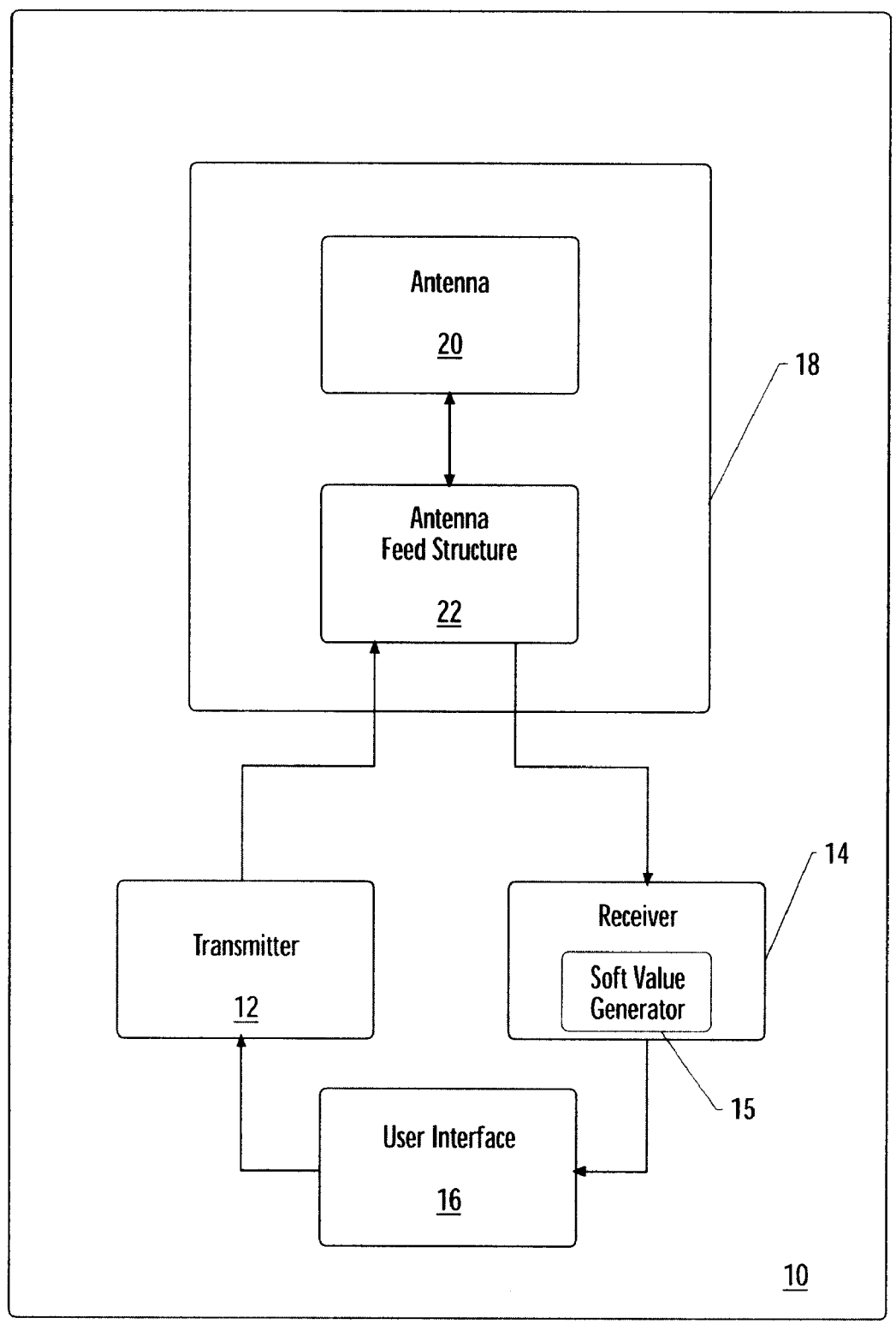
FIG. 4 is a block diagram of a radiotelephone incorporating the present invention.

An embodiment of a radiotelephone 10 which includes a soft value generator 15 according to the present invention is depicted in the block diagram of FIG. 4. As shown in FIG. 4, radiotelephone 10 typically includes a transmitter 12, a receiver 14, a user interface 16 and an antenna system 18. The antenna system 18 may include an antenna feed structure 22 and an antenna 20. As is well known to those of skill in the art, transmitter 12 converts the information which is to be transmitted by radiotelephone 10 into an electromagnetic signal suitable for radio communications. Receiver 14 demodulates electromagnetic signals which are received by radiotelephone 10 so as to provide the information contained in the signals to user interface 16 in a format which is understandable to the user. A wide variety of transmitters 12, receivers 14, user interfaces 16 (e.g., microphones, keypads, rotary dials) which are suitable for use with handheld radiotelephones are known to those of skill in the art, and such devices may be implemented in radiotelephone 10. The design of radiotelephone 10 other than the software generator 15 is well known to those of skill in the art and will not be further described herein. Furthermore, as will be appreciated by those of skill in the art, the present invention may be utilized in a base station and such an embodiment of the present invention need not be further described herein.

Figure 5:
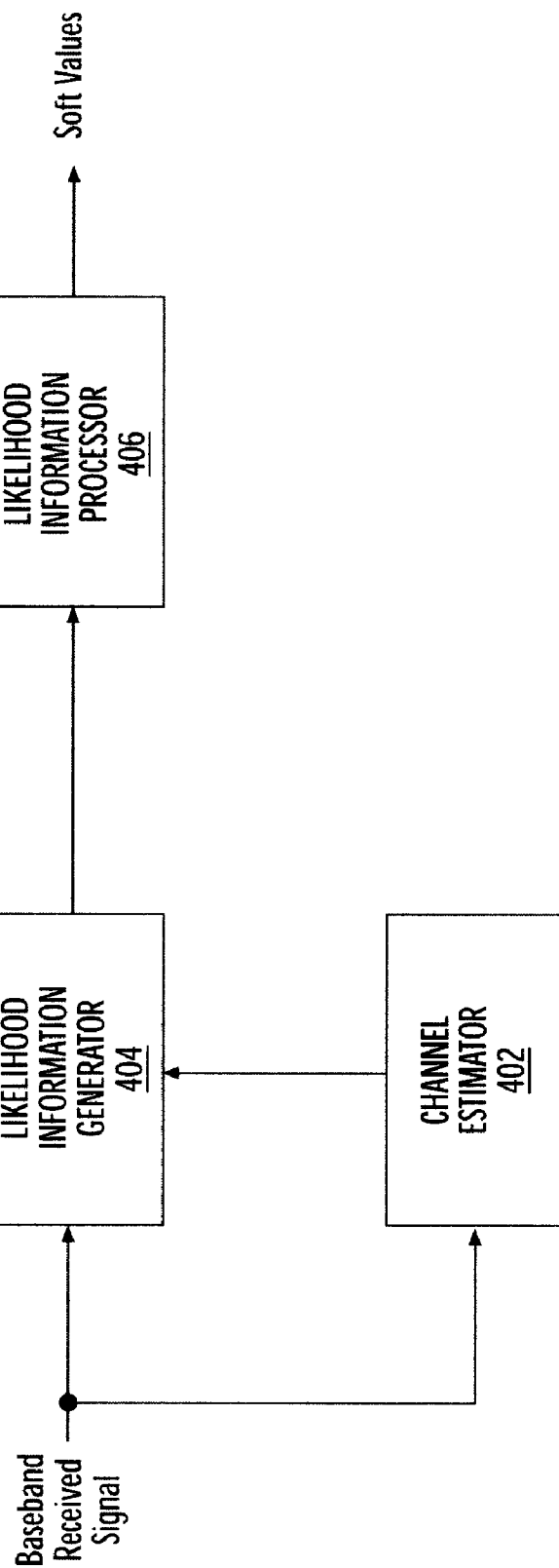
FIG. 5 is a block diagram of one embodiment of the present invention.

FIG. 5 depicts a coherent demodulator for DQPSK modulated signals incorporating the soft value generator 15 according to the teachings of the present invention. The baseband received signal is coupled to the likelihood information generator 404 and the channel estimator 402. The output of the channel estimator 402 is coupled to the input of the likelihood information generator 404. The output of the likelihood information generator 404 is coupled to the input of the likelihood information processor 406.

In operation, the channel estimator 402 estimates the complex channel coefficient corresponding to the mobile radio channel. In essence, each received sample r(k) is modeled as:

$$r(k)=c(k)s(k)+n(k) \tag{a}$$

where c(k) is the complex channel coefficient, s(k) is the coherent QPSK symbol sent, and n(k) is noise. By contrast, in an equalizer, the channel is modeled with multiple channel taps as:

$$r(k)=c_0(k)s(k)+c_1(k)s(k-1)+n(k) \tag{b}$$

In the present invention, channel estimation refers to estimating a single channel coefficient associated with a received value as shown in the equation (a) above.

The baseband received signal and the channel estimate are used in likelihood information generator 404 to calculate the likelihood functions corresponding to different QPSK symbol hypotheses.

The likelihood information generator 404 may provide likelihood or log-likelihood functions. The output of the likelihood information generator 404 is passed to the likelihood information processor 406 to calculate the soft information values corresponding to each bit. The partition of the functions in blocks such as the likelihood information generator 404 and likelihood information processor 406 can differ from implementation to implementation and, therefore, the present invention should not be limited to the configuration illustrated in FIG. 5. Also, blocks 404 and 406 can be combined to obtain a single function which generates soft information using the channel parameters and the received baseband signal. In the present description, only one partition is described, however, those of skill in the art will recognize other suitable partitions.

For the remainder of the description herein, the coherent QPSK symbols are represented with a(k), and at the time instance k, and the differential symbol, $b(k)=b_R+jb_I(k)$, is a function of $\{a(k), a(k-1)\}$, i.e., $b(k)=e^{j\pi/4}a(k)[a(k-1)]^*$. Real (in-phase) and imaginary (quadrature-phase) bits of the differential symbols are represented as $b_R(k)$ and $b_I(k)$ respectively. Table 1 summarizes the relation between the phase of b(k), $\{a(k), a(k-1)\}$, and the sign of $b_R(k)$ and $b_I(k)$ (±1 in value) for DQPSK. For π/4-shift DQPSK, $b(k)=a(k)[a(k-1)]^*$ and Table 1 below would be modified accordingly.

Soft information can be obtained by taking the log-likelihood ratio of the probability of the detecting+1 (0) and the probability of the detecting −1 (1), given the received signal. For coherent demodulation of multi-channel/multi-antenna signals, the log-likelihood ratio can be written as:

$$LR = \log\left[\frac{P\{b_i(k) = +1 \mid r(k), r(k-1)\}}{P\{b_i(k) = -1 \mid r(k), r(k-1)\}}\right] \tag{1}$$

where i=R or I, $r(k)=[r_1(k) \ldots r_N(k)]^t$ is the vector representation of the received signal on N antennas. As can be seen, each differential bit depends on current and previous received signal values. For DQPSK, Equation 1 becomes:

$$LR = \log \left[ \frac{\sum_{x=0}^{3}\sum_{y=0}^{3} I(+1, x, y, i) P}{\{a(k) = S_x \ \& \ a(k-1) = S_y \mid r(k), r(k-1)\}} \right] \quad (2)$$

where $I \subset \{1,0\}$ is the indicator function whose values can be obtained from Table 1, and $S_j = e^{jl\pi/2 + \pi/4}$ and where x and y correspond to the 4 possible values for the symbols corresponding to a(k) and a(k−1) respectively. Note that the indicator function is on half the time, so that of the 16 possible combinations, there are 8 that correspond to the numerator and 8 that correspond to the denominator. The terms that correspond to the numerator and the denominator can be obtained using Table 1. As a result, in Equation 2 both numerator and denominator consist of the logarithm of a sum of 8 terms, using the fact that $\log(a/b) = \log(a) - \log(b)$.

TABLE 1

Relation between coherent symbols, differential symbols and differential bits

| a (k) | a (k − 1) | b (k) | $b_R$ (k) | $b_I$ (k) |
|---|---|---|---|---|
| π/4 | π/4 | π/4 | + | + |
| π/4 | 3π/4 | −π/4 | + | − |
| π/4 | −π/4 | 3π/4 | − | + |
| π/4 | −3π/4 | −3π/4 | − | − |
| 3π/4 | π/4 | 3π/4 | − | + |
| 3π/4 | 3π/4 | π/4 | + | + |
| 3π/4 | −π/4 | −3π/4 | − | − |
| | −3π/4 | −π/4 | + | − |
| −π/4 | π/4 | −π/4 | + | − |
| −π/4 | 3π/4 | −3π/4 | − | − |
| −π/4 | −π/4 | π/4 | + | + |
| −π/4 | −3π/4 | 3π/4 | − | + |
| −3π/4 | π/4 | −3π/4 | − | − |
| −3π/4 | π/4 | 3π/4 | − | + |
| −3π/4 | π/4 | −π/4 | + | − |
| −3π/4 | −3π/4 | π/4 | + | + |

Using the Bayes rule, assuming equi-likely bit values, Equation 2 can be re-written as:

$$LR = \log \left[ \frac{\sum_{x=0}^{3}\sum_{y=0}^{3} I(+1, x, y, i) P}{\{r(k) \mid a(k) = S_x\} P\{r(k-1) \mid a(k-1) = S_y\}} \right] \quad (3)$$

Equation 3, which uses coherent QPSK symbol hypotheses, gives the optimal soft information. The probabilities in Equation 3 for multiple receive antennas can be written as:

$$P\{r(k) \mid a(K) = S_i\} = \frac{1}{\pi^N |R_{nn}(k)|} e^{-(r(k)-r_h(k))^H R_{nn}^{-1}(k)(r(k)-r_h(k))} \quad (4)$$

where $r_h(k) = c(k) S_i$ is the hypothesis of the received signal and $R_{nn}$ is the noise or impairment correlation matrix. Substituting the probabilities, Equation 3 can be re-written as seen in Equation 5.

$$LR = \log \left[ \frac{\sum_{x=0}^{3}\sum_{y=0}^{3} I(+1, x, y, i)\exp\{-(r(k) - r_h(k, S_x))^H R_{nn}^{-1}(k)(r(k) - r_h(k, S_x)) - (r(k-1) - r_h(k-1, S_y))^H R_{nn}^{-1}(k)(r(k-1) - r_h(k-1, S_y))\}}{\sum_{x=0}^{3}\sum_{y=0}^{3} I(-1, x, y, i)\exp\{-(r(k) - r_h(k, S_x))^H R_{nn}^{-1}(k)(r(k) - r_h(k, S_x)) - (r(k-1) - r_h(k-1, S_y))^H R_{nn}^{-1}(k)(r(k-1) - r_h(k-1, S_y))\}} \right] \quad (5)$$

In equation 5, there are metrics corresponding to coherent symbol log likelihoods of the form:

$$M = -(r(k) - r_h(k, S_x))^H R_{nn}^{-1}(k)(r(k) - r_h(k, S_x)) \quad (5b)$$

For the special case that the noise power is equal on each antenna and the spatial correlation of the noise across different antennas is zero, the above likelihood function becomes:

$$\hat{b}_i^{opt} = \log \left[ \frac{\sum_{x=0}^{3}\sum_{y=0}^{3} I(+1, x, y, i)\exp\left\{-\sum_{d=1}^{N} \frac{|r_d(k) - r_{d,h}(k, S_x)|^2}{2\sigma^2(k)} + \frac{|r_d(k-1) - r_{d,h}(k-1, Sy)|^2}{2\sigma^2(k)}\right\}}{\sum_{x=0}^{3}\sum_{y=0}^{3} I(-1, x, y, i)\exp\left\{-\sum_{d=1}^{N} \frac{|r_d(k) - r_{d,h}(k, S_x)|^2}{2\sigma^2(k)} + \frac{|r_d(k-1) - r_{d,h}(k-1, Sy)|^2}{2\sigma^2(k)}\right\}} \right] \quad (6)$$

where $\sigma^2$ is the noise power on each antenna. As can be seen, the optimal soft information for multi-channel/multi-antenna receivers can be obtained by first combining the metrics on different antennas (predetection combining), followed by soft information generation. Equation 6 can be further simplified as $$\hat{d}_i^{opt} = \log\left[\sum_{x=0}^{3}\sum_{y=0}^{3} I(+1, x, y, i)\exp\left\{-\sum_{d=1}^{N}\text{Re}\left\{\frac{c_d(k)^*}{\sigma^2(k)}S_{d,x}^*r_d(k)\right\} + \right.\right. \quad (7)$$

$$\left.\left.\text{Re}\left\{\frac{c_d(k-1)^*}{\sigma^2(k)}S_{d,y}^*r_d(k-1)\right\}\right\}\right] -$$

$$\log\left[\sum_{x=0}^{3}\sum_{y=0}^{3} I(-1, x, y, i)\exp\left\{-\sum_{d=1}^{N}\text{Re}\left\{\frac{c_d(k)^*}{\sigma^2(k)}S_{d,x}^*r_d(k)\right\} + \right.\right.$$

$$\left.\left.\text{Re}\left\{\frac{c_d(k-1)^*}{\sigma^2(k)}S_{d,y}^*r_d(k-1)\right\}\right\}\right].$$

In Equation 7, the following term appears throughout:

$$M = -\text{Re}\left\{\frac{c_d(k)^*}{\sigma^2(k)}S_{d,x}^*r_d(k)\right\}. \quad (8)$$

This term is referred to as a coherent (QPSK) symbol metric corresponding to the log likelihood of a potential or hypothetical coherent symbol. However, the term metric generally refers to a value which indicates the probability of a possible symbol value being encoded in the signal samples of the received signal.

Figure 6:
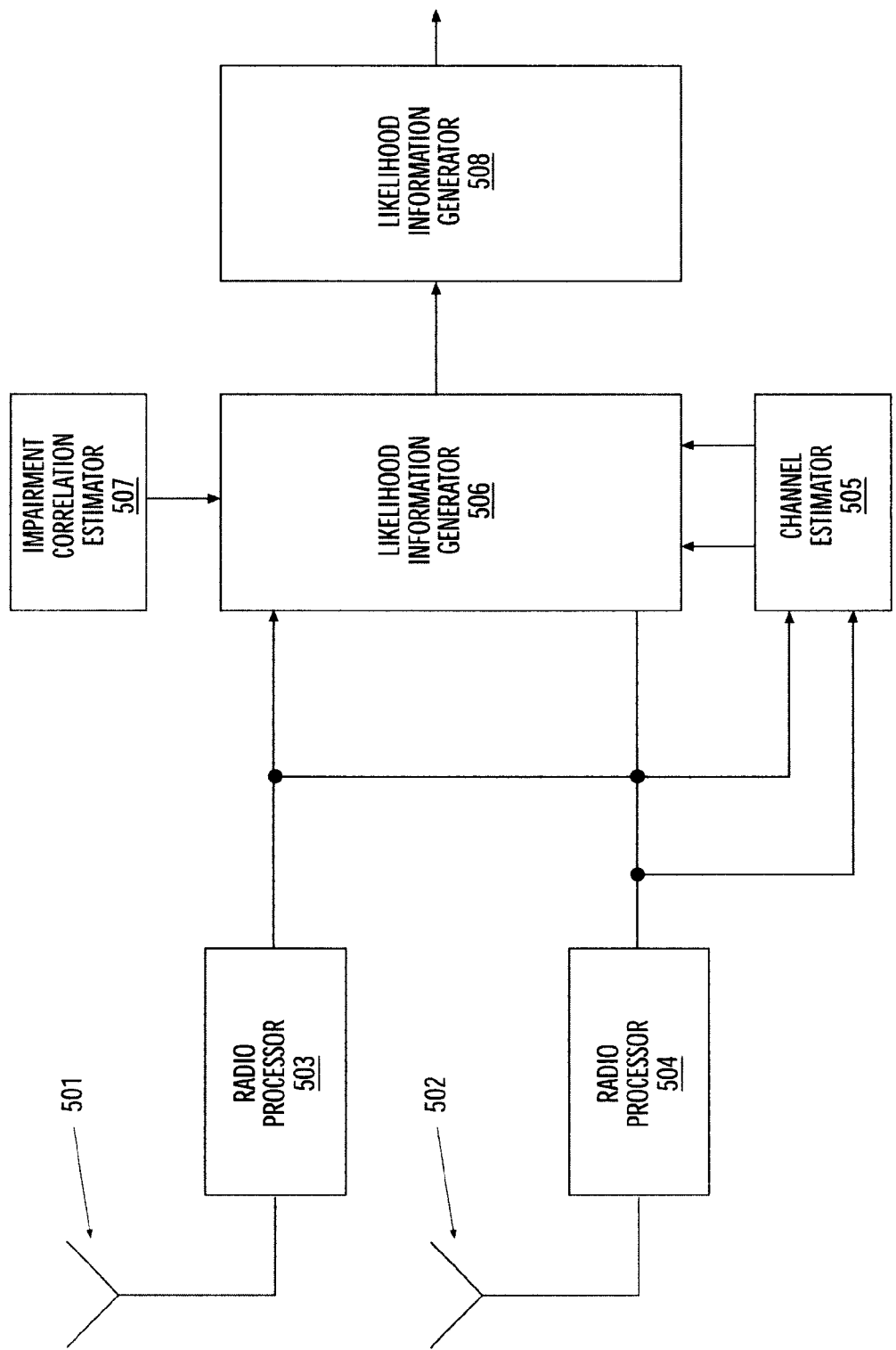
FIG. 6 is a block diagram of an alternative embodiment of the present invention.

One implementation of the soft information generation based on the above expressions using multi-antenna receivers considering both thermal noise and other interference (like co-channel interference) is shown in FIG. 6. The transmitted signal plus the impairment (thermal noise+ interference) are received at the receiver antennas 501 and 502. The received signals are processed by the radio processors 503 and 504, each of which amplify, mix, filter, sample and quantize to produce a baseband signal for a different antenna. Such radio processing is well known to those of skill in the art, and, therefore, will not be described in detail herein. The channel coefficients are estimated in channel estimator 505 for each signal on different antennas using the baseband signals at the output of the radio processors 503 and 504. Such channel estimation is also well known to those of skill in the art and will not be described further herein.

Impairment correlation among the antennas is estimated in impairment correlation estimator 507 which can operate as described in U.S. Pat. No. 5,680,419 to Bottomley entitled METHOD AND APPARATUS FOR INTERFERENCE REJECTION COMBINING IN MULTI-ANTENNA DIGITAL CELLULAR COMMUNICATION SYSTEMS the disclosure of which is incorporated herein by reference as if set forth fully. The baseband signals, channel estimates and impairment correlation estimates are provided to likelihood information generator 506 which computes metrics corresponding to $P\{r(k)|a(k)=S_x\}$ (see equation 5b). The likelihood information is processed in likelihood information processor 508 to produce soft and/or hard differential bit or differential symbol values (such as Equation 5).

Figure 7:
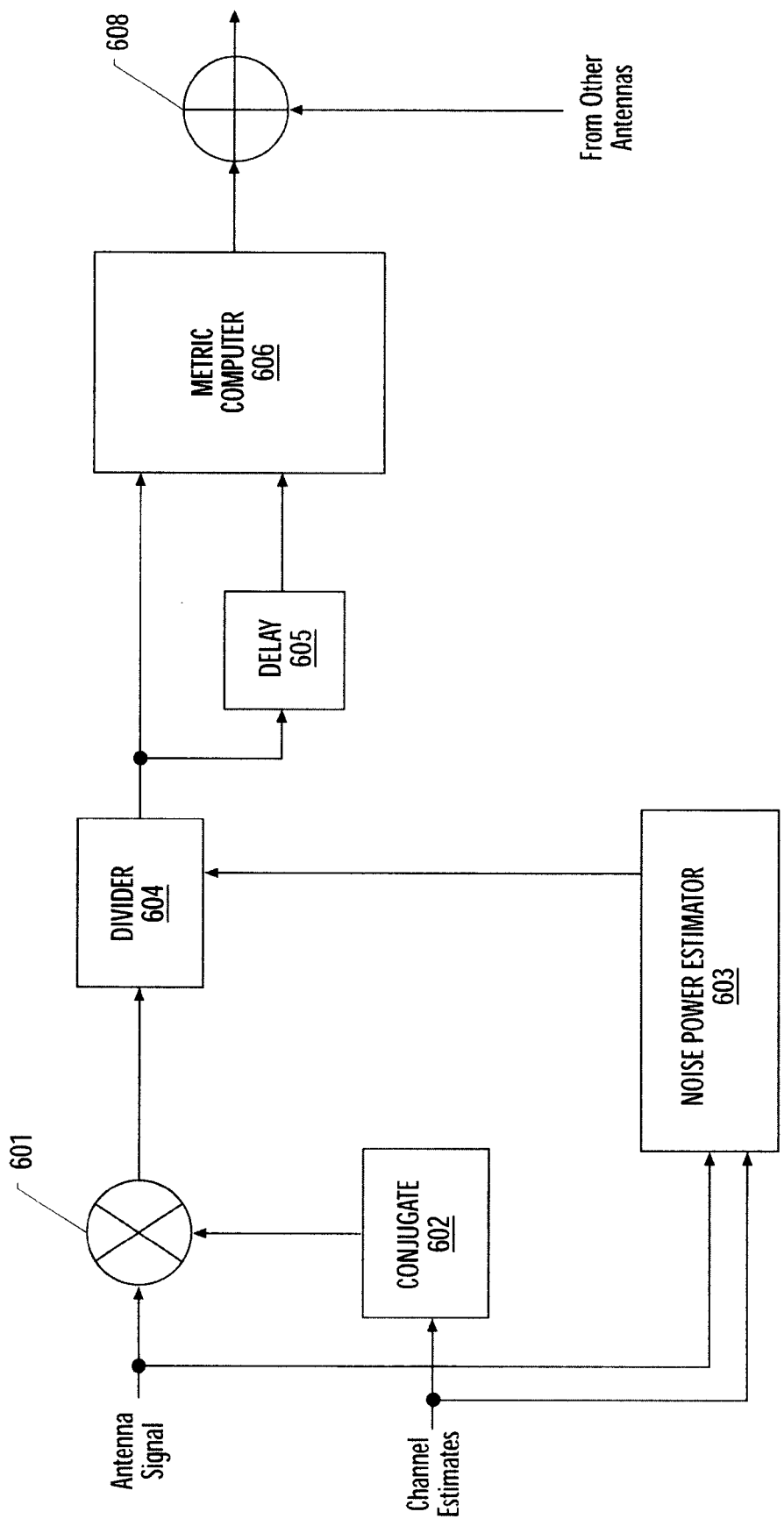
FIG. 7 is a block diagram of a second alternative embodiment of the present invention.

An alternative embodiment of the present invention for uncorrelated noise on each antenna is shown in FIG. 7. The present value of the baseband signal is multiplied 601 with the conjugate 602 of the channel estimate and the result is divided 604 by the value of the noise power estimate 603. The noise power estimate is obtained by using the baseband signal and the channel estimates as is well known to those of skill in the art. Relative noise powers may be used, and noise power estimation may be omitted, if the relative noise powers are known. If the relative noise powers are known to be equal, division by the noise power may be omitted.

The output of the divider is coupled with the metric computer 606 and a delay block 605. The present value and the previous (delayed) values plus the hypothesis of the present and previous coherent symbols are used to compute the metrics as described in Equation 8. The metric values from different antennas are combined as shown in Equation 7 in adder 608. Thus, the blocks of FIG. 7 except the adder 608 may be repeated for each antenna. If there is only one antenna, adder 608 may be eliminated. These combined metric values are used to obtain soft bit values for the differential bits in likelihood information processor 406 or 508. The combination of the present values and previous values results in 16 different metric combinations. Out of these 16 combinations only half results in detection of a +1 value for the differential bit, and the remaining half results in -1. In likelihood information processor 406 or 508 the 8 combinations which provide a +1 bit value are used to obtain the first log term as shown in Equation 7 by first taking the exponential of these terms, then summing them all, and finally taking the logarithm of the sum. In the same way, the second log term is obtained by considering the other 8 terms. Finally, the soft differential bit value is obtained by taking the difference of the two log terms.

Although in the present embodiment the soft information generation for the decoding of the received signal is described, these soft values can also be used to obtain the hard values by taking the sign of the soft values. Also, for the generation of the hard values, the logarithm operation can be avoided by computing the numerator and the denominator and then finding the larger of these two values, which provides the hard decision.

Figure 8:
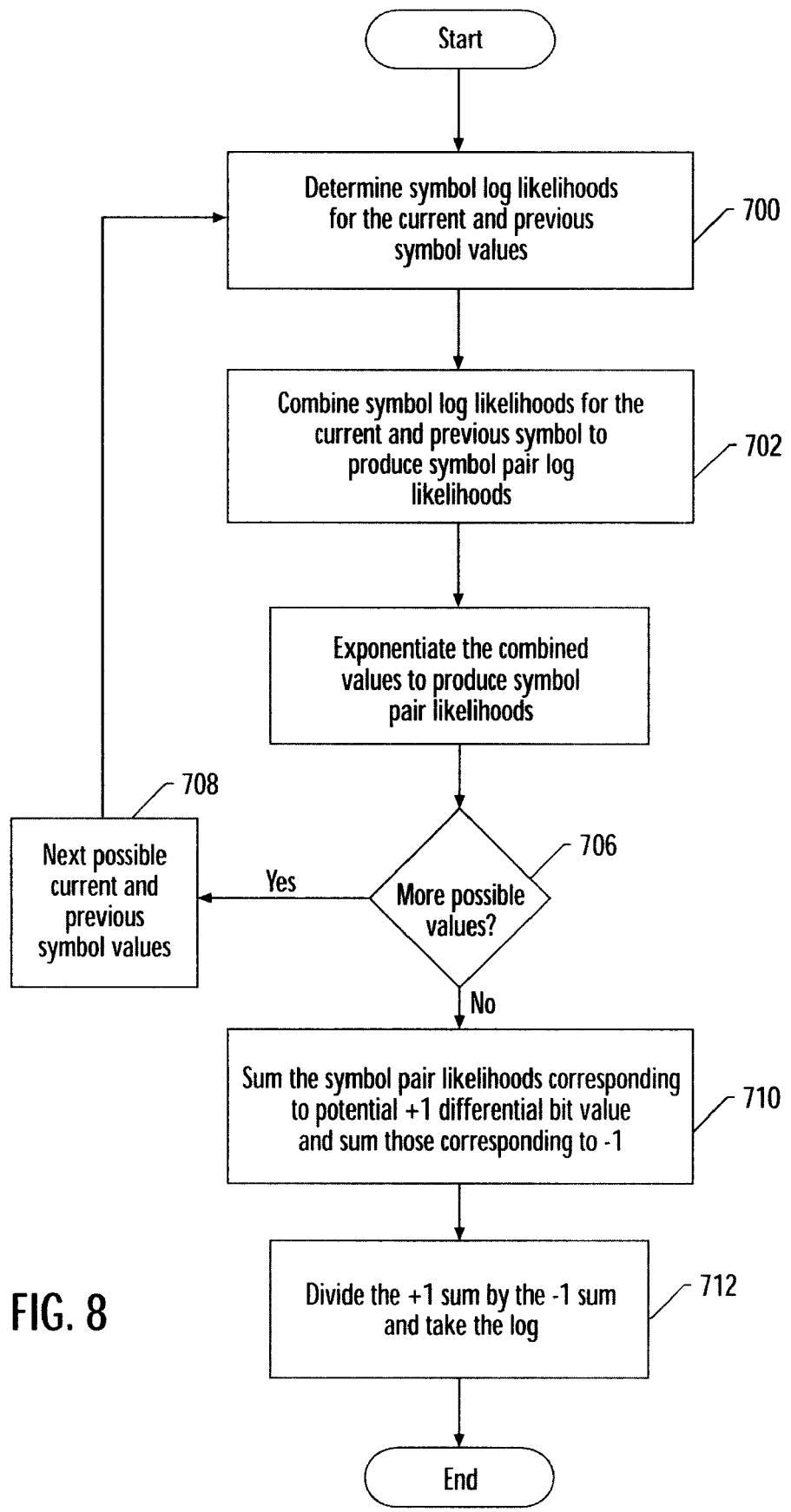
FIG. 8 is a flow chart illustrating operations of one embodiment of the present invention.

The operation of this first embodiment of the present invention is illustrated in the flow chart of FIG. 8. As seen in FIG. 8, the determination of the soft values begins by determining symbol log likelihoods (block 700) which corresponds to calculating the metrics of Equations 5b or 8. These metrics are then combined (block 702) and exponentiated (block 704). The process is repeated for all symbol pairs (blocks 706 and 708). Once a combined metric has been determined for each hypothetical symbol pair, then the combined metrics corresponding to a potential +1 are summed and the combined metrics corresponding to a potential -1 are summed (block 710). The +1 sum is then divided by the -1 sum and the logarithm of that value taken to provide the soft values (block 712).

As seen from the discussion above, to obtain theoretically optimal soft information involves exponentiation and logarithm operations. Also, the impairment correlation or noise variance needs to be estimated and taken into account in each metric calculation. The computational complexity can be reduced by approximating the sums of exponentials with their largest terms, in both numerator and denominator. Because, for reasonable SNR values, the sums are dominated by the largest terms, hence, the effect of other terms can be neglected. Therefore, in the first alternative approach, the log-likelihoods for all symbol hypotheses are calculated as follows:

$$M(k, x) = \frac{-|r(k) - r_h(k, S_x)|^2}{\sigma_k^2} \quad (9)$$

or

-continued $$M(k, x) = \text{Re}\left\{\frac{c_k^*}{\sigma_k^2}S_x^* r_k\right\}$$

where x ⊂ {0,1,2,3}. Symbol pair log likelihoods may then be determined as follows:

$$C(k,x,y)=M(k-1,x)+M(k,y) \quad (10)$$

Note that these metrics are the sum of two transmitted symbol log-likelihoods. Using Table 1, the metrics for the numerator (+1), and denominator (−1) are grouped: G(k,+1)=set of C(k,x,y) such that the differential bit =+1 and G(k,−1)=set of C(k,x,y) such that the differential bit =−1. Each of these sets has 8 elements. Then, the maximum of each group is determined. The soft information in terms of these maximum metrics can be written as:

$$\hat{b}_i^{sub1}(k)=\max(G(k,+1))-\max(G(k,-1)) \quad (11)$$

The first alternative approach requires the computation of sixteen combined metrics, C(k,x,y), at each symbol index k. In fact, at each symbol index only four coherent metrics are calculated. The sixteen combined metrics are obtained by using the coherent metrics at time k and k−1 using Equation 10. Note that, even if a hard decision is determined, the most likely values for the detected coherent symbols are those which maximizes the coherent metrics at each time index. If the detected differential bit is d, then finding the maximum from G(k,d) is the same as the summation of the maximum metrics (most likelihood values) which are obtained at the symbol instants k, max (M(k, $S_x$)) and k−1, max (M(k−1, $S_x$)). Therefore, in the detected bit term, the 8 combination terms are not required to find the maximum of them. The two QPSK symbols may be detected and the metrics associated with the detected values utilized. However, in the non-detected term, the 8 combination terms and their maximum is required in the first alternative approach.

One realization of the first alternative approach can be obtained using the same block diagram as shown in FIG. 5. The likelihood information generator provides the symbol metrics corresponding to the present values and the symbol metrics corresponding to the previous values. In the likelihood information processor, the maximum of the 8 terms (which is the combination of the metrics corresponding to the present values and previous values which provide a +1 or −1 for the differential bit value) in the numerator and the denominator are selected. The soft information is obtained by taking the difference of these two maximum values. Therefore, the alternative approach does not require exponentiation and logarithm operations. Moreover, the knowledge of the noise variance is not needed for the calculation of soft information as long as it is constant. However, it can be used if desired, should the noise be dominated by time-varying interference.

Figure 9:
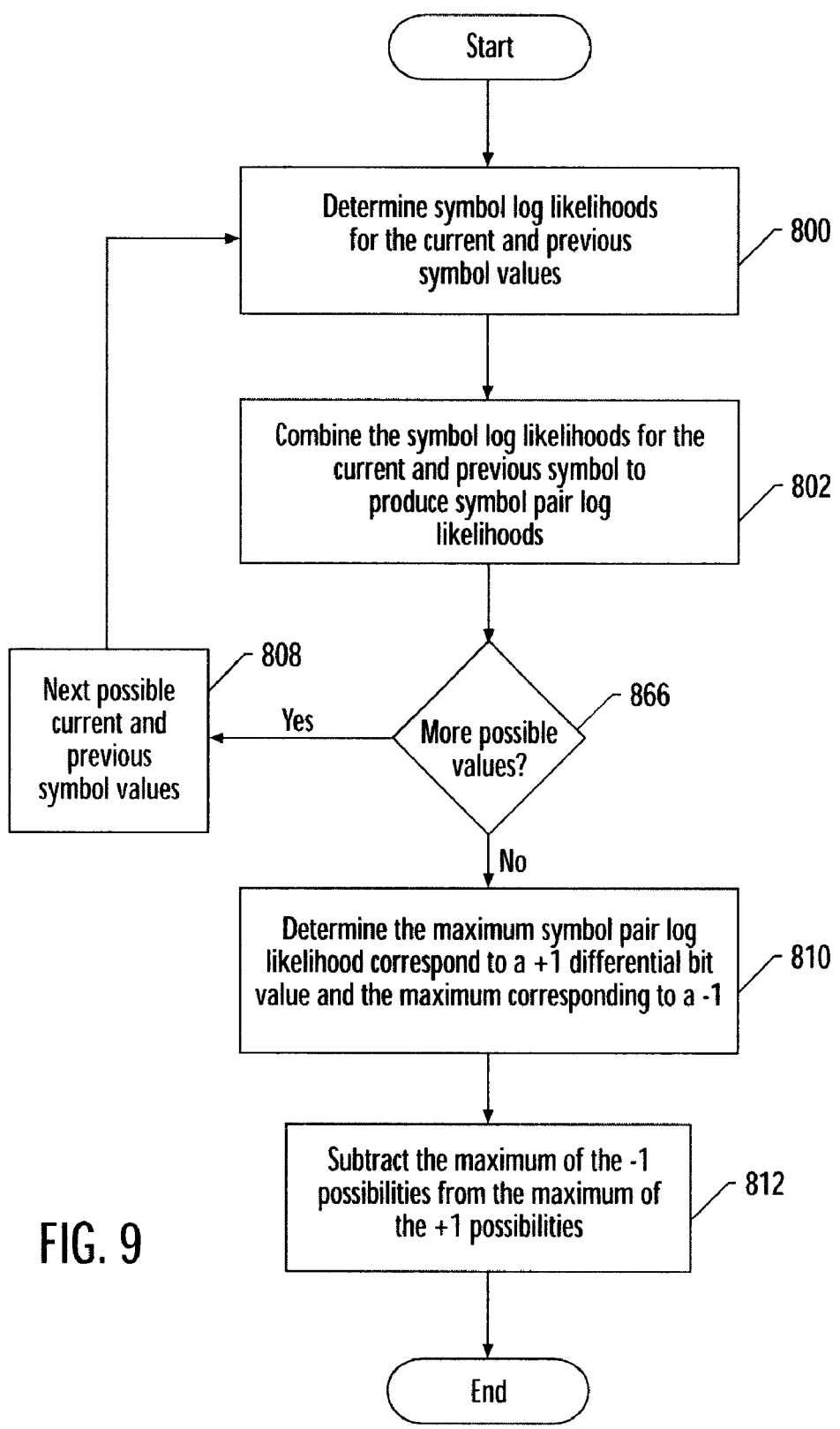
FIG. 9 is a flow chart illustrating operations of an alternative embodiment of the present invention.

The operations of this first alternative embodiment are illustrated in FIG. 9. As with the embodiment illustrated in FIG. 8, the determination of the soft values begins by determining the log likelihood of a possible symbol pair value for the current and previous symbols (block 800) which corresponds to calculating the metrics of Equations 5b or 8. These metrics are then combined (block 802). If there are more possible symbol pairs, then the process is repeated for the next symbol pair (blocks 806 and 808). Otherwise, when a combined metric has been determined for each hypothetical symbol pair, then the maximum combined metric corresponding to a potential +1 is determined and the maximum combined metric corresponding to a potential −1 is determined (block 810). The −1 maximum combined metric is then subtracted from the +1 maximum combined metric to provide the soft value (block 812).

In another alternative embodiment of the present invention, using the metric values which are provided by the likelihood information generator, the detected differential bit values are decided by finding the most likely coherent QPSK symbol values (by finding the coherent symbol which minimizes the symbol metric) for the present and previous values. The sum of the minimum symbol metric values at the present and previous time provides the numerator or the denominator (depending on the detected bit value) terms. Then, the term corresponding to the non-detected bit value (opposite of the detected bit value) can be obtained by finding the maximum of the 8 terms corresponding to the non-detected bit values.

Although in the first alternative approach the best terms for the detected and non-detected values are used, the approach can be generalized by taking the best $K_1$ terms for the detected values and $K_2$ terms for the non-detected values.

The second alternative embodiment is obtained by further simplification of the previous alternative approach, in which it is assumed that the dominant terms include at least one detected symbol value. Therefore, in the second alternative embodiment the minimum of the 8 terms for the non-detected case is not found. Instead, it is assumed that the maximum of the 8 terms includes one of the detected QPSK symbols with high probability. Once the detected symbols are found and the corresponding metrics, the combined metric is calculated, $C_{det}=M(k, S_{det}(k))+M(k-1, S_{det}(k-1))$. In the non-detected term, by assuming that the dominating terms will include one of the detected symbols, one of the symbols is fixed as the detected symbol and the other term toggled with the closest border symbol and then the corresponding metric sum is found, $C_{nd1}=M(k, S_{det}(k))+M_{toggle}(k-1, S_{toggle}(k-1))$. In the same way, the other symbol is fixed as the detected symbol and the previously fixed symbol toggled with the closest border symbol and the second corresponding metric sum found, $C_{nd2}=M_{toggle}(k, S_{toggle}(k))+M(k-1, S_{det}(k-1))$. The maximum of these two metric sums is chosen as the maximum term in the non-detected term, $C_{nd}=\max\{C_{nd1},C_{nd2}\}$. As can be seen, this approach uses a further assumption to further reduce the computational complexity of the soft value determination.

If the above approach is generalized to any detected differential bit {+1 or −1}, the detected bit, $b_{i,det}$, is first determined by using the minimum metrics. Then, the above method is applied as if the detected bit is +1. The soft bit value, then, is calculated as:

$$\hat{b}_i^{sub2}(k)=b_{i,det}\{C_{det}-C_{nd}\} \quad (12)$$

where $b_{i,det}=\pm 1$.

This approach can be further simplified by observing that $M_{det}$ and $M_{nd}$ will contain a common term. Therefore:

$$\Delta_1=M_{toggle}(k-1, S_{toggle}(k-1))-M(k-1,S_{det}(k-1)) \quad (13)$$

$$\Delta_2=M_{toggle}(k,S_{toggle}(k))-M(k,S_{det}(k)) \quad (14)$$

then $$\hat{b}_i^{sub2}(k)=b_{i,det}(\min\{\Delta_1,\Delta_s\}) \quad (15)$$

Alternatively, using the metric values which are provided by the likelihood information generator, the detected differential bit values are decided by finding the most likely coherent symbol values (by finding the coherent symbol which minimizes the metric) for the present and previous values. The sum of the maximum metric values at the present and previous time provides the numerator or the denominator (depending on the detected bit value) terms. For the non-detected term, by assuming that the dominating terms will include one of the detected symbols, one of the symbols is fixed as the detected coherent symbol and the other term toggled with the closest border symbol.

Figure 10:
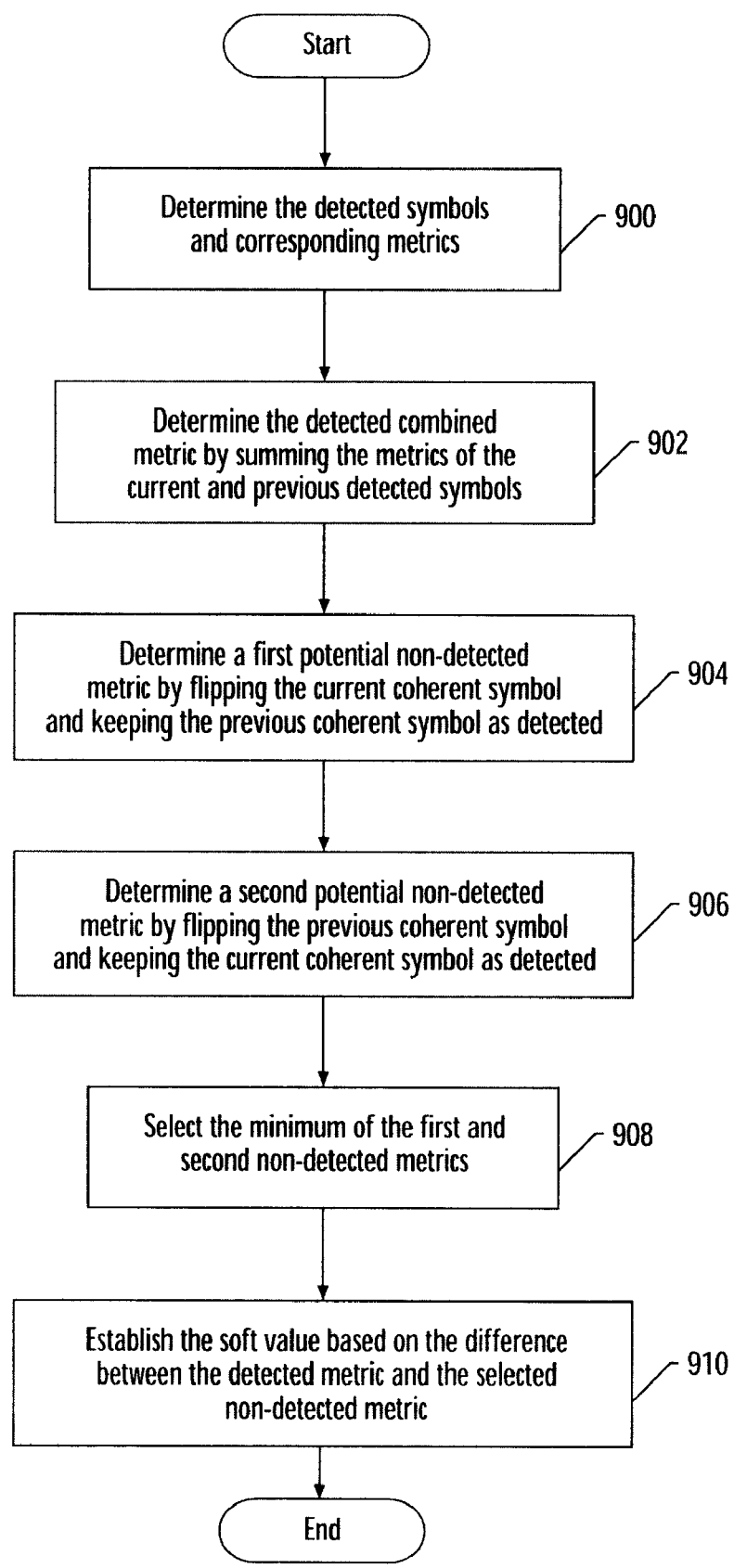
FIG. 10 is a flowchart illustrating operation of the second alternative embodiment of the present invention.

The second alternative embodiment of the present invention is illustrated in FIG. 10. As seen in FIG. 10, the detected symbols are determined and their corresponding metrics (block 900). Then the detected combined metric is determined by summing the maximum metric of the detected symbols (block 902). A first potential non-detected combined metric is determined (block 904) and a second potential non-detected combined metric is also determined (block 906). The maximum of these non-detected combined metrics is selected (block 908) and the soft value determined based on the selected non-detected combined metric and the detected combined metric (block 910).

While an example of multiple receive antennas was given, the present invention is applicable to any single and multi-channel receiver. The multiple channels could correspond to antennas in an antenna array, such as a phased array or diversity array, possibly with different polarizations. The multiple channels could also correspond to multiple beams or multiple carriers or multiple codes or multiple time slots.

The present invention can also be used to produce soft information on differential symbols (di-bits). Instead of a likelihood ratio, likelihoods for each of the different symbol values would be produced. For example, for DQPSK, four soft values would be produced, one for each possible differential symbol value. For the optimal approach, the log likelihood of a differential symbol value would be the sum of four terms, i.e.

$$LL(S_{diff}) = \log\left[\sum_{x=0}^{3}\sum_{y=0}^{3} J(S_{diff}, x, y)P\{a(k) = S_x \& a(k-1) = S_y \mid r(k), r(k-1)\}\right] \quad (17)$$

With the first alternative approach, only the largest of the four terms would be used, or its likelihood. For the second alternative approach, the symbol likelihood would include one of the detected symbol terms.

It will be apparent to one of skill in the art in light of the present disclosure that, by negating the symbol likelihood metric, and maximization operation should be replaced with the minimization operation. Accordingly, the terms maximize and minimize can be replaced by the term extremize, which means taking the maximum or minimum depending on how the metrics are defined.

While the present invention has been described with respect to DQPSK, the present invention is applicable to any form of differential encoding, including M' ary DPSK (DQPSK corresponds to M=4), differential amplitude encoding or a combination of the two. In addition, the present invention is applicable to a mixture of differential and normal encoding, providing soft information or detected values to the differentially encoded bits or symbols. In essence, coherent symbol pairs are hypothesized and symbol pair (combined) metrics are produced. Combinations corresponding to one differential bit value are grouped as are combinations corresponding to the other differential bit value. The likelihood ratio or an approximation to it are then determined.

The present invention has been described with respect to FIGS. 8 through 10 which are flowchart illustrations of embodiments of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of generating differential values from signal samples of a differentially encoded received signal, the method comprising:

estimating channel coefficients associated with the received signal;

determining metrics for each possible coherent symbol pair which indicate the probability of a possible coherent symbol pair being encoded in the received signal using the estimated channel coefficients and the signal samples of the received signal; and determining differential values associated with information differentially encoded in the received signal based on the determined metrics.

2. A method according to claim 1, wherein the step of determining differential values comprises the steps of:

exponentiating the metrics to form processed metrics corresponding to all possible pairs of symbol values;

summing the processed metrics corresponding to a first differential bit value to provide a first value metric sum; and summing the processed metrics corresponding to a second differential bit value to provide a second value metric sum.

3. A method according to claim 2, further comprising dividing the first value metric sum by the second value metric sum to provide a ratio of probabilities of the bit value being the first value and bit value being the second value.

4. A method according to claim 3, further comprising the step of determining the log of the ratio of probabilities to provide a soft bit value.

5. A method according to claim 3, further comprising the step of comparing the first metric sum and the second metric sum to determine a hard bit value.

6. A method according to claim 1, wherein the differentially encoded received signal is received at a plurality of antennas and wherein said step of estimating channel coefficients associated with the differentially encoded signal comprises estimating channel coefficients associated with each of the plurality of antennas; and said step of determining metrics for each possible symbol pair comprises the step of determining metrics for each possible symbol pair which indicate the probability of a possible symbol pair being encoded in the signal samples of the received signal using the estimated channel coefficients and the signal samples of the received signal for at least one antenna.

7. A method according to claim 6, further comprising the step of summing the metrics for each antenna.

8. A method according to claim 6, further comprising the step of:

determining an impairment correlation estimate for the plurality of antennas; and wherein said step of determining metrics comprises the step of determining metrics for each possible symbol pair which indicate the probability of a possible symbol pair being encoded in the signal samples of the received signal using the estimated channel coefficients, the impairment correlation estimate and the received signal samples of at least one antenna.

9. A method according to claim 1, wherein the differential values correspond to differential bit values.

10. A method according to claim 9, wherein the differential bit values are soft bit values.

11. A method according to claim 9, wherein the differential bit values are hard bit values.

12. A method according to claim 1, wherein the differential values correspond to differential symbol values.

13. A method according to claim 12, wherein the differential symbol values are soft symbol values.

14. A method according to claim 12, wherein the differential symbol values are hard symbol values.

15. A method according to claim 1, further comprising the step of:

determining a noise power associated with the received signal; and wherein said step of determining metrics, comprises the step of determining metrics for each possible symbol pair which indicate the probability of a possible symbol pair being encoded in the signal samples of the received signal using the estimated channel coefficients, the noise power and the received signal samples.

16. A method according to claim 1, wherein the received signal samples are generated by a radiotelephone receiving and processing a received signal.

17. A method according to claim 1, wherein the step of determining metrics comprises the step of:

determining symbol metrics for each possible coherent symbol value which indicate the probability of a possible coherent symbol value using the estimated channel coefficients and the signal samples; and summing pairs of symbol metrics to determine metrics for each possible coherent symbol pair.

18. A method of generating differential values from signal samples of a differentially encoded received signal, the method comprising:

estimating channel coefficients associated with the received signal;

determining metrics for each possible pair of coherent symbol values which indicate the probability of a possible symbol pair being encoded in the signal samples of the received signal using the estimated channel coefficients and the signal samples;

determining the extremum metrics of the metrics for each possible symbol pair corresponding to a differential values to provided extremum metrics; and determining a differential value based on the extremum metrics.

19. A method according to claim 18, wherein the differentially encoded signal is received at a plurality of antennas and wherein said step of estimating channel coefficients associated with the received signal comprises estimating channel coefficients associated with each of the plurality of antennas; and said step of determining metrics for each possible symbol pair comprises the step of determining metrics for each possible symbol pair which indicate the probability of a possible symbol pair being encoded in the signal samples of the received signal using the estimated channel coefficients and the signal samples of at least one antenna.

20. A method according to claim 19, further comprising the step of summing the metrics for each antenna.

21. A method according to claim 19, further comprising the step of:

determining an impairment correlation estimate for the plurality of antennas; and wherein said step of determining metrics comprises the step of determining metrics for each possible symbol pair which indicate the probability of a possible symbol pair being encoded in the signal samples of the received signal using the estimated channel coefficients, the impairment correlation estimate and the signal samples for at least one antenna.

22. A method according to claim 18, wherein the differential values are differential bit values.

23. A method according to claim 22, wherein the differential bit values are soft bit values.

24. A method according to claim 22, wherein the differential bit values are hard bit values.

25. A method according to claim 18, wherein the differential values correspond to differential symbol values.

26. A method according to claim 25, wherein the differential symbol values are soft symbol values.

27. A method according to claim 25, wherein the differential symbol values are hard symbol values.

28. A method according to claim 18, further comprising the step of:

determining a noise power associated with the received signal; and wherein said step of determining metrics, comprises the step of determining metrics for each possible symbol pair which indicate the probability of a possible symbol pair being encoded in the signal samples of the received signal using the estimated channel coefficients, the noise power and the signal samples.

29. A method of generating differential values from signal samples of a differentially encoded received signal, the method comprising:

estimating channel coefficients associated with the received signal;

determining detected coherent symbol values based on the received signal samples and the channel coefficients;

determining a detected metric based on detected symbol values corresponding to a first and a second symbol period, the received samples and the channel coefficients;

determining a first potential non-detected metric based on a detected symbol corresponding to the first symbol period, the received samples and the channel coefficients;

determining a second potential non-detected metric based on a detected symbol corresponding to the second symbol period, the received samples and the channel coefficients;

determining a selected non-detected metric using the extremum of the first and second potential non-detected metrics; and determining at least one differential value based on the detected metric and the selected non-detected metric.

30. A method according to claim 29, wherein the differentially encoded signal is received at a plurality of antennas and wherein said step of estimating channel coefficients associated with the received signal comprises estimating channel coefficients associated with each of the plurality of antennas; and said step of determining metrics for a detected symbol comprises the step of determining a detected metric based on detected symbol values corresponding to a first and a second symbol period, the received samples and the channel coefficients associated with at least one of the antennas.

31. A method according to claim 30, further comprising the step of:

determining an impairment correlation estimate for the plurality of antennas; and wherein said step of determining a detected metric comprises the step of determining a detected metric based on detected symbol values corresponding to a first and a second symbol period, the received samples, the channel coefficients and the impairment correlation estimate.

32. A method according to claim 29, wherein the differential values are differential bit values.

33. A method according to claim 32, wherein the differential bit values are soft bit values.

34. A method according to claim 32, wherein the differential bit values are hard bit values.

35. A method according to claim 29, wherein the differential values correspond to differential symbol values.

36. A method according to claim 35, wherein the differential symbol values are soft symbol values.

37. A method according to claim 35, wherein the differential symbol values are hard symbol values.

38. A method according to claim 29, further comprising the step of:

determining a noise power associated with the received signal; and wherein said step of determining a detected metric comprises the step of determining a detected metric based on detected symbol values corresponding to a first and a second symbol period, the received samples, the channel coefficients and the noise power.

39. An apparatus for generating differential values from signal samples of a differentially encoded received signal, comprising:

means for estimating channel coefficients associated with the received signal;

means for determining metrics for each possible coherent symbol pair which indicate the probability of a possible coherent symbol pair being encoded in the received signal using the estimated channel coefficients and the signal samples of the received signal; and means for determining differential values associated with information differentially encoded in the received signal based on the determined metrics.

40. An apparatus according to claim 39, wherein the means for determining differential values comprises:

means for exponentiating the metrics to form processed metrics corresponding to all possible pairs of symbol values;

means for summing the processed metrics corresponding to a first differential bit value to provide a first value metric sum; and means for summing the processed metrics corresponding to a second differential bit value to provide a second value metric sum.

41. An apparatus according to claim 40, further comprising means for dividing the first value metric sum by the second value metric sum to provide a ratio of probabilities of the bit value being the first value and bit value being the second value.

42. A method according to claim 41, further comprising the step of comparing the first metric sum and the second metric sum to determine a hard bit value.

43. An apparatus according to claim 41, further comprising means for determining the log of the ratio of probabilities to provide a soft bit value.

44. An apparatus according to claim 39, wherein the differentially encoded received signal is received at a plurality of antennas and wherein said means for estimating channel coefficients associated with the differentially encoded signal comprises means for estimating channel coefficients associated with each of the plurality of antennas; and said means for determining metrics for each possible symbol pair comprises means for determining metrics for each possible symbol pair which indicate the probability of a possible symbol pair being encoded in the signal samples of the received signal using the estimated channel coefficients and the signal samples of the received signal for at least one antenna.

45. An apparatus according to claim 44, further comprising means for summing the metrics for each antenna.

46. An apparatus according to claim 44, further comprising:

means for determining an impairment correlation estimate for the plurality of antennas; and wherein said means for determining metrics comprises means for determining metrics for each possible symbol pair which indicate the probability of a possible symbol pair being encoded in the signal samples of the received signal using the estimated channel coefficients, the impairment correlation estimate and the received signal samples of at least one antenna.

47. An apparatus according to claim 39, wherein the differential values correspond to differential bit values.

48. An apparatus according to claim 47, wherein the differential bit values are soft bit values.

49. An apparatus according to claim 47, wherein the differential bit values are hard bit values.

50. An apparatus according to claim 39, wherein the differential values correspond to differential symbol values.

51. An apparatus according to claim 50, wherein the differential symbol values are soft symbol values.

52. An apparatus according to claim 50, wherein the differential symbol values are hard symbol values.

53. An apparatus according to claim 39, further comprising:

means for determining a noise power associated with the received signal; and wherein said means for determining metrics, comprises means for determining metrics for each possible symbol pair which indicate the probability of a possible symbol pair being encoded in the signal samples of the received signal using the estimated channel coefficients, the noise power and the received signal samples.

54. An apparatus according to claim 39, wherein the received signal samples are generated by a radiotelephone receiving and processing a received signal.

55. An apparatus according to claim 39, wherein the means for determining metrics comprises:
means for determining symbol metrics for each possible coherent symbol value which indicate the probability of a possible coherent symbol value using the estimated channel coefficients and the signal samples; and
means for summing pairs of symbol metrics to determine metrics for each possible coherent symbol pair.

56. An apparatus for generating differential values from signal samples of a differentially encoded received signal, comprising:
means for estimating channel coefficients associated with the received signal;
means for determining metrics for each possible pairs of coherent symbol values which indicate the probability of a possible symbol pair being encoded in the signal samples of the received signal using the estimated channel coefficients and the signal samples;
means for determining the extremum metrics of the metrics for each possible symbol pair corresponding to a differential values to provided extremum metrics; and
means for determining a differential value based on the extremum metrics.

57. An apparatus according to claim 56, wherein the differentially encoded signal is received at a plurality of antennas and wherein said means for estimating channel coefficients associated with the received signal comprises means for estimating channel coefficients associated with each of the plurality of antennas; and
said means for determining metrics for each possible symbol pair comprises means for determining metrics for each possible symbol pair which indicate the probability of a possible symbol pair being encoded in the signal samples of the received signal using the estimated channel coefficients and the signal samples of at least one antenna.

58. An apparatus according to claim 57, wherein further comprising means for summing the metrics for each antenna.

59. An apparatus according to claim 57, further comprising:
means for determining an impairment correlation estimate for the plurality of antennas; and
wherein said means for determining metrics comprises means for determining metrics for each possible symbol pair which indicate the probability of a possible symbol pair being encoded in the signal samples of the received signal using the estimated channel coefficients, the impairment correlation estimate and the signal samples for at least one antenna.

60. An apparatus according to claim 56, wherein the differential values are differential bit values.

61. An apparatus according to claim 60, wherein the differential bit values are soft bit values.

62. An apparatus according to claim 60, wherein the differential bit values are hard bit values.

63. An apparatus according to claim 56, wherein the differential values correspond to differential symbol values.

64. An apparatus according to claim 63, wherein the differential symbol values are soft symbol values.

65. An apparatus according to claim 63, wherein the differential symbol values are hard symbol values.

66. An apparatus according to claim 56, further comprising:
means for determining a noise power associated with the received signal; and
wherein said means for determining metrics, comprises means for determining metrics for each possible symbol pair which indicate the probability of a possible symbol pair being encoded in the signal samples of the received signal using the estimated channel coefficients, the noise power and the signal samples.

67. An apparatus for generating differential values from signal samples of a differentially encoded received signal, comprising:
means for estimating channel coefficients associated with the received signal;
means for determining detected coherent symbol values based on the received signal samples and the channel coefficients;
means for determining a detected metric based on detected symbol values corresponding to a first and a second symbol period, the received samples and the channel coefficients;
means for determining a first potential non-detected metric based on a detected symbol corresponding to the first symbol period, the received samples and the channel coefficients;
means for determining a second potential non-detected metric based on a detected symbol corresponding to the second symbol period, the received samples and the channel coefficients;
means for determining a selected non-detected metric using the extremum of the first and second potential non-detected metrics; and
means for determining at least one differential value based on the detected metric and the selected non-detected metric.

68. An apparatus according to claim 67, wherein the differentially encoded signal is received at a plurality of antennas and wherein said means for estimating channel coefficients associated with the received signal comprises means for estimating channel coefficients associated with each of the plurality of antennas; and
said means for determining metrics for a detected symbol comprises means for determining a detected metric based on detected symbol values corresponding to a first and a second symbol period, the received samples and the channel coefficients associated with at least one of the antennas.

69. An apparatus according to claim 68, further comprising:
means for determining an impairment correlation estimate for the plurality of antennas; and
wherein said means for determining a detected metric comprises means for determining a detected metric based on detected symbol values corresponding to a first and a second symbol period, the received samples, the channel coefficients and the impairment correlation estimate.

70. An apparatus according to claim 67, wherein the differential values are differential bit values.

71. An apparatus according to claim 70, wherein the differential bit values are soft bit values.

72. An apparatus according to claim 70, wherein the differential bit values are hard bit values.

73. An apparatus according to claim 67, wherein the differential values correspond to differential symbol values.

74. An apparatus according to claim 73, wherein the differential symbol values are soft symbol values.

75. An apparatus according to claim 73, wherein the differential symbol values are hard symbol values.

76. An apparatus according to claim 67, further comprising the step of:

means for determining a noise power associated with the received signal; and wherein said means for determining a detected metric comprises means for determining a detected metric based on detected symbol values corresponding to a first and a second symbol period, the received samples, the channel coefficients and the noise power.

77. A method of generating differential values from signal samples of a differentially encoded received signal, the method comprising:

estimating channel coefficients associated with the received signal;

determining detected coherent symbol metrics corresponding to a first and second symbol period based on signal samples of the received signal and the channel coefficients;

determining toggled coherent symbol metrics corresponding to a first and second symbol period based on signal samples of the received signal and the channel coefficients; and determining at least on differential value based on the detected coherent symbol metrics and the toggled coherent symbol metrics.

78. An apparatus for generating differential values from signal samples of a differentially encoded received signal, comprising:

means for estimating channel coefficients associated with the received signal;

means for determining detected coherent symbol metrics corresponding to a first and second symbol period based on signal samples of the received signal and the channel coefficients;

means for determining toggled coherent symbol metrics corresponding to a first and second symbol period based on signal samples of the received signal and the channel coefficients; and means for determining at least on differential value based on the detected coherent symbol metrics and the toggled coherent symbol metrics.

* * * * *